United States Patent [19]

Cohen

[11] 4,232,978
[45] Nov. 11, 1980

[54] DOUBLE LOCKING DEVICE

[75] Inventor: Murray Cohen, Seaford, N.Y.

[73] Assignee: Grumman Aerospace Corporation, Bethpage, N.Y.

[21] Appl. No.: 930,498

[22] Filed: Aug. 3, 1978

[51] Int. Cl.² .............................................. F16B 39/00
[52] U.S. Cl. .................................... 403/317; 403/343
[58] Field of Search ............... 403/118, 320, 46, 319, 403/343, 346, 317, 318; 151/29, 24, 4, 41.76, 46

[56] References Cited

U.S. PATENT DOCUMENTS

| 2,821,419 | 11/1958 | Walton | 403/319 |
| 3,736,010 | 5/1973 | Larkin | 403/104 |
| 3,989,394 | 11/1976 | Ellis | 403/320 X |
| 4,042,306 | 8/1977 | Murray | 403/320 X |
| 4,092,080 | 5/1978 | Bradley, Jr. | 403/319 |

Primary Examiner—Andrew V. Kundrat
Attorney, Agent, or Firm—Richard G. Geib; Mellor A. Gill

[57] ABSTRACT

In a coupling of members subject to rotational uncoupling forces a lock key that unites the members and holds them from relative rotational movement with a fastener for the lock key to not only secure the lock key to one or the other members but insure proper locking with the lock key of the members.

10 Claims, 11 Drawing Figures

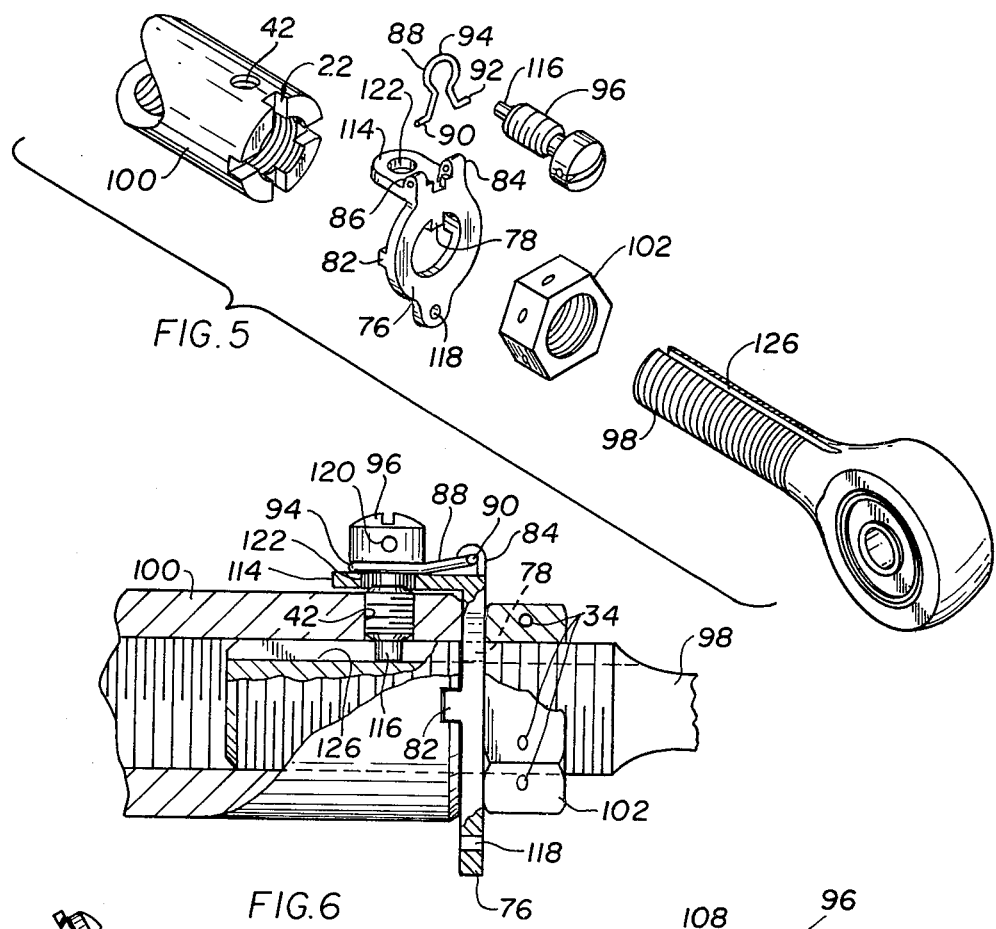
FIG. 5
FIG. 6
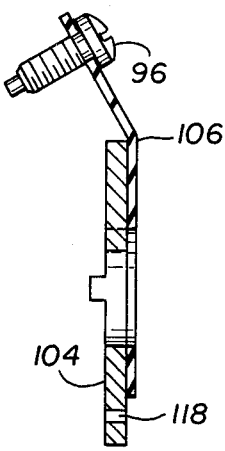
FIG. 7
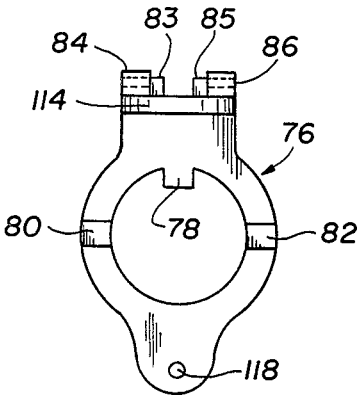
FIG. 8
FIG. 9

DOUBLE LOCKING DEVICE

The Government of the United States of America has rights to this invention pursuant to Contract No. N00019-76-C-0212 awarded by the Department of the Navy.

BRIEF SUMMARY

Most military and commercial aircraft utilize combinations of bellcranks, push/pull rods, bungees (spring loaded pushrods) and hydraulic actuators to operate flight controls and landing gear systems. Since bungees and hydraulic actuators have a tendency to produce relative rotary motion during operation, system integrity has frequently depended upon anti-rotation locking devices to prevent such motion. Those skilled in the art use standard parts per the National Aerospace Standards Committee's Classifications, NAS 513, NAS 559 and NAS 1193. The U.S. Government has also established a standard part designation; i.e., Military Specification Sheet, MIL-B-81935/3 for such also.

Unfortunately, such standard parts have recently shown themselves to be possible of faulty assembly, and most certainly, not fail safe. It has been reported that over one-third of aircraft inspected, as are covered by the above standards, were improperly assembled, and over one-fourth of these were critical linkages. A disconnect of only one of the above standards could have caused a loss of linkage from pilot to control members. The consequence of such a failure could result in uncontrollable flight or an uncontrollable landing, and possibly the subsequent loss of an airplane. An article entitled, "Don't Assume, Be Sure", written by T. Graziano, Mech. Spring, 1978, pp. 12–15, describes the limitations of the standard locking devices currently being used.

It is in this environment, that this invention, the Double Lock Device, finds particular utility, as is possible upon an understanding of said invention, to implement fail safe features in critical flight controls and landing gear linkages.

DRAWING DESCRIPTION

With reference now to the sheets of drawings of the disclosure of this invention:

FIG. 5 is an isometric exploded view of a preferred form of rod end connection in accordance with this invention;

FIG. 6 is a partially cross-sectioned side view of a rod end connection of the structure of FIG. 5;

FIG. 7 is a cross-sectioned side view of an alternative lock key for use in the connection of FIG. 6;

FIG. 8 is a partially cross-sectioned view of the dog screw used in securing the lock keys of FIGS. 5, 6 and 7;

FIG. 9 is an end view of the lock key of FIGS. 5 and 6;

DETAILED DESCRIPTION

Prior Art

For several years now the problem of securing actuator rod end to control system connections has been in compliance with the aforesaid standards. This was required because of the tendencies of actuators and bungees to operate with a rotational component that, without locking devices such as provided by following the aforesaid standards, could uncouple the actuator or bungee from the control system.

These standards attempted to preclude human error of installation by providing tabs, slots and grooves to integrate the connection means and locking devices. What was found to be overlooked was the problem of "forced assembly"; i.e., an assembly of the elements such that the tabs and slots are out of registry when facing each other, or when the tab is facing opposite of the slot.

Figure 1:
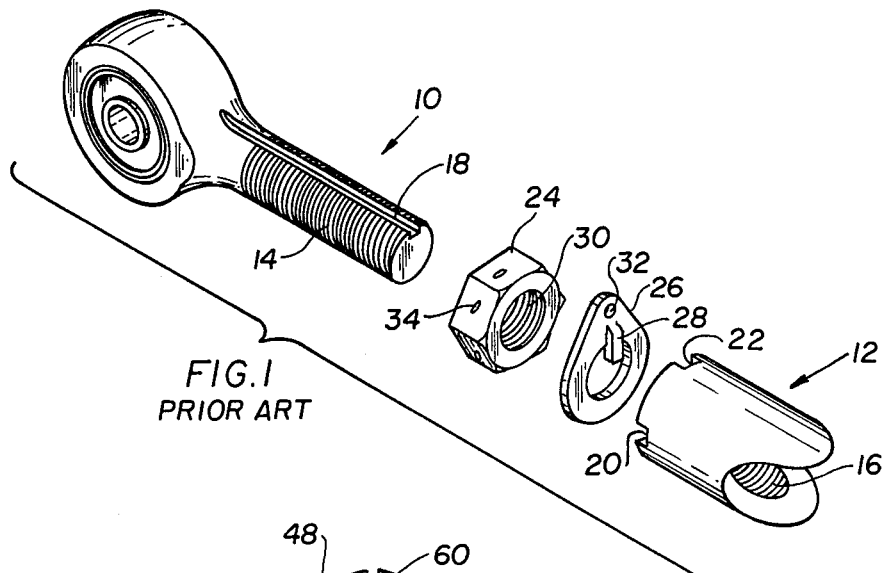
FIG. 1 is an isometric exploded view of prior art rod end connection lock structure per NAS 513.

One may ask how can such happen and go unchecked. To explain this, reference is made to FIG. 1, where a rod end terminal 10 is to be joined to a collar 12 as by mating threaded portions 14 and 16. As seen, the terminal 10 has a groove 18 and the collar 12 has four equidistant slots, two of which (20, 22) are shown facing the terminal 10. A jamnut 24 with threads 30 is threaded to the terminal 10 before it is mated to collar 12. Also a lock key 26 is fitted over the threaded end 14 so as to be spaced from collar 12 during assembly of terminal 10 and collar 12. The lock key 26 has a tab 28 extending both down and away from its body to be slidable on end 14 in groove 18 and insertable in slot 20, 22, etc. It is so positioned whenever the terminal and collar have been adjusted to a proper length, whereupon jamnut 24 is wrenched up to hold the lock key 26 in such locking attitude. Thereafter, a safety wire (see FIG. 11) is drawn through holes 32 and 34 of key 26 and jamnut 24 and tightened (twisted) to secure the lock structure.

This assembly of structure would appear to dictate that there was no possible way that connections using same will be other than locked and secured. However, it has been found that one may, following improper procedures, install key 26 backwards or use excessive force in tightening of jamnut 24 with tab 28 not in a slot 20 or 22, etc., to provide appearances of being locked and secured when that is not the case.

The seriousness of this problem is readily seen when one can appreciate that even a light airplane uses over seventy (70) applications of these locking devices. In one such airplane studied, forty (40) of the applications can be considered to affect safety of flight.

INVENTION

With this in mind, this invention discloses improvements to this locking device to preclude the possibility of disengagement by providing before safety wiring a double locking feature, and a simpler visual inspection. Actually, in the realization of this invention, the lock key is not dependent on the jamnut or safety wire to maintain the locking of terminal and collar as in the prior art of FIG. 1 and other standard devices heretofore used. Stated another way, the unique feature to be observed by those skilled in the art as a result of this disclosure is that the locking device of this invention, a new lock key 36 of FIG. 2, cannot disengage even if a lockwire is lost or omitted, or if the jamnut 40 backs off, or is not tightened properly.

Figure 2:
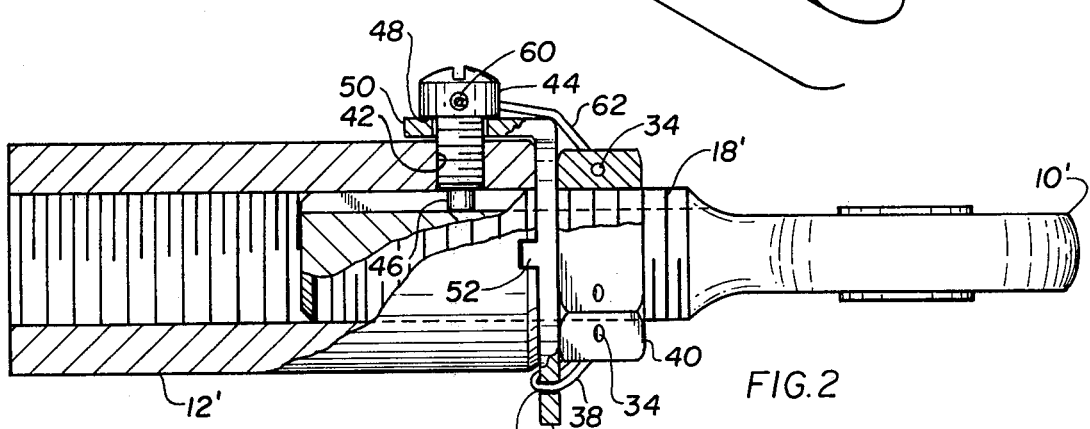
FIG. 2 is a partially cross-sectioned side view of a male rod end connection employing a double lock according to this invention.

With reference specifically to FIG. 2, the collar 12' is shown to be joined with rod end terminal 10'. This connection is locked by means of a lock key 36 which has a groove tab (not shown) and slot tabs 52 that in cooperation with a groove, like 18 in terminal 10 of FIG. 1, and slots, like 20, 22, etc., in collar 12 of FIG. 1, will prohibit relative rotation of collar 12' and terminal 10'. In the embodiment of FIG. 2, the key 36 has a shelf 50 that extends back over the collar 12'. The shelf is bored at a predetermined location that is chosen to be aligned over a tapped bore 42 in collar 12' when and only when key 36 is assembled so that tabs 52 are bottomed in the slots. A dog screw 44 is then threaded into the tapped bore with its dog 46 bottomed in groove 18' prior to head 48 bottoming on shelf 50. Thereafter, a jamnut 40 (actually jamnut 40 could be used to locate key 36 prior to dog screw assembly) is tightened about terminal 10' to bear against the key 36 and bottom it on the face of collar 12'. A safety wire is next assembled by one wire 38 from hole 118 to an appropriate one of the holes 34 and a second wire 62 from one of the holes 34 to and through a hole 60 in the dog screw head. These safety wires are then twisted an appropriate number of times to couple the dog screw to key and jamnut to key.

The dimensioning of the slots for tabs 52 is chosen so that dog screw 44 cannot be inserted unless 52 is bottomed in the slots of the face of the collar 12'. It is not, therefore, possible to insert the dog screw with improper assembly of the key. As one may readily appreciate, more slots in the face will permit finer adjustment of the length of the collar/terminal assembly. If such be done, then the number of tapped holes 42 will have to be also increased. This, however, is limited to the diameter and thickness of the collar that will permit more than one hole, for example, at no sacrifice to structural integrity.

Figures 3, 4:
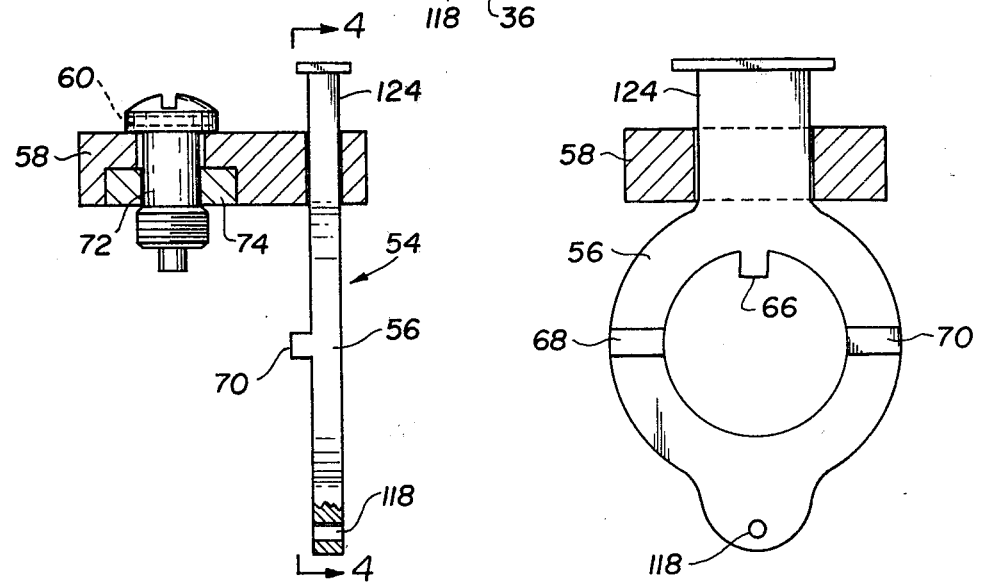
FIG. 3 is a partially cross-sectioned side view of a lock key of alternative form than that shown with the rod end connection of FIG. 2.
FIG. 4 is a partially cross-sectioned end view along lines 4—4 of FIG. 3.

In FIGS. 3 and 4, a modified lock key 54 is shown comprising a two part assembly of a locking key 56 and a plate 58. The key is peened over on top to maintain assembly. The lock key 56 has tabs 66, 68 and 70 for the terminal groove 18 and collar slots 20, 22. Tabs 68 and 70 as with tabs 52 aforedescribed, are dimensioned so that they must bottom in slots of the collar, as in FIG. 2, before final assembly can occur to lock the terminal and collar together. A dog screw 72 is retained by a split washer 74 in the plate 58. This will enhance field assembly and disassembly by preventing handling of small dog screw 72 apart from lock key 56. The plate 58 moves up and down on neck 124 of lock key 56 a limited distance. Therefore, when the tabs 68 and 70 are bottomed in the slots, the dog screw 72 is threaded into an appropriate bore of the collar to permit the integration of lock key 56 to the terminal 10 and collar 12; i.e., the dog screw 72 is aligned with a threaded bore (see bore 42 of FIG. 2) when the lock key is flush with the collar 12. Holes 118 in key 56 and 60 in dog screw 72 are for safety wiring as aforedescribed.

With reference to FIG. 5, a preferred structural combination is shown that uses a lock key 76 having a right angle shelf 114, bored as at 122, a groove collar tab 78 and slot tabs 80 and 82 (80 being shown by FIG. 9) and integral bored ears 84 and 86. A retainer spring 88 is formed to have fingers 90, 92 and an annular portion 94 of an internal diameter to rotatingly hold a dog screw 96 when fingers 90 and 92 are in the bores of ears 86 and 84, as shown by FIG. 6. Again, the rod terminal 98, collar 100 and jamnut 102 are standard parts used by those skilled in the art. The assembly, absent safety wiring through holes 118, 34 and 120, is shown by FIG. 6.

In FIG. 7, there is shown still another modification for a lock key showing an annular structure 104 to which has been bonded an elastic dog screw retainer 106 to again permit field supply of an integrated lock key 104 and dog screw 96.

FIG. 8 shows the dog screw 96 in more detail. As shown, it has a necked portion 108 between screwdriver head 110 and threaded body 112. The dog 116 is sized to snugly fit the groove in the rod terminal without interference as aforedescribed; i.e., on proper assembly, dog 116 bottoms in groove before the head 110 is tight on the shelf 114 of the key 76 or 104. As such, the dog screw 96 cannot be threaded to the collar 100 until dog 116 is aligned with the groove 126 of the rod terminal 98, and, therefore, thread damage to the terminal 98 is precluded. The annular portion 94 of the spring 88 is sized to loosely fit about the necked portion 108 loosely when fingers 90 and 92 are in the ears 84 and 86. Such loose fit will permit the rotation of the dog screw without removal from retainer 88. Also this will take care of tolerances and other manufacturing variances.

In FIG. 9 the groove tab 78 and slot tabs 80 and 82 are more clearly shown plus stops 83 and 85 that prevent the dog screw 96 from folding back over jamnut 102 (see FIG. 6).

Figure 10:
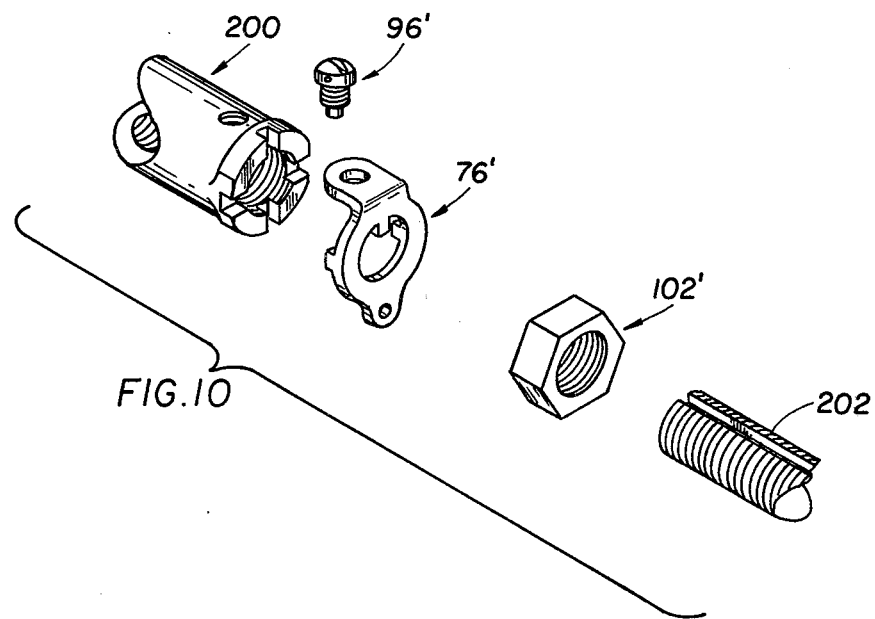
FIG. 10 is an isometric exploded view of structure using this invention to connect shafts.
Figure 11:
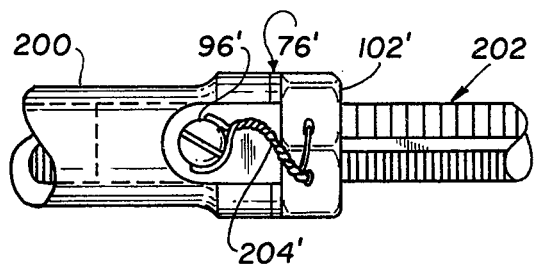
FIG. 11 is an orthographic view of the structure of FIG. 10.

FIGS. 10 and 11 depict similar structure, as identified by prime numbers from FIGS. 5 and 6, for securing the connection of shafts 200 and 202 and safetying same, top wire 204' only being shown.

I claim:

1. Means to double lock a connection, said means comprising:
   a first part to be used in a connection, said first part having a longitudinal bore and a slot in its end face and a bore through its sidewall into said longitudinal bore;
   a second part to be inserted into and thereby joined with the first part in the longitudinal bore with means therein making the connection between the first part and the second part, said second part having a longitudinal groove;
   a lock key having a groove tab within said groove and a slot tab within said slot when interposed with said first part and said second part, said lock key further having a shelf that extends over said first part with a bore through the shelf that upon seating of the slot tab in the slot is aligned with the bore through the sidewall of said first part;
   a jamnut to hold said lock key such that the slot tab is in the slot and the bore of the shelf is aligned with the bore through the sidewall of said first part; and
   a dog screw with threads of a limited length and a reduced diameter dog extending beyond the threads, said dog screw being insertable through the bore of the shelf and threaded within the bore in the sidewall of said first part that lies under the shelf, said dog being projected into said groove to, with said lock key, prevent removal of said second part from said first part and thereby double lock the connection thereof.

2. Secured locking means for a connection of relatively rotatable members, said means including:

one member having an end portion with a longitudinal groove in a surface thereof;
another member to be connected to said one member, said another member having a tapped bore a predetermined distance from an end that has slots of a predetermined depth in its face which receives said one member;
a lock key having a groove tab and at least one slot tab cooperating with the groove of the one member and the slots of the another member to prevent relative rotation thereof, said lock key carrying a dog screw to extend towards said tapped bore and be threaded thereinto to bottom in the groove of the one member thereunder when said slot tab is bottomed in the slot of the face of the another member; and
means about the one member to hold the slot tabs in position while the dog screw is being threaded in the bore.

3. A positive locking device comprising:
a male member having a threaded extension that is longitudinally grooved;
a female member having a threaded bore to receive said male member, said female member having a face about said threaded bore that is provided with a plurality of slots of a predetermined depth and at least one tapped hole a predetermined distance back of said face open to said threaded bore;
a lock key about said male member and oriented thereto by a groove tab depending from the lock key, said lock key having at least one slot tab of a pretermined extension to bottom in at least one slot in the face of the female member when the lock key is flush on the face, said lock key further having means to be aligned with said tapped hole when flush with the face as aforesaid;
a dog screw adapted to be presented to said tapped hole by said means of said lock key, said dog screw having a dog of a predetermined length that will prevent threading into said tapped hole unless said male member has its groove under said hole and such as to bottom in the groove before binding on the male member of the lock key; and
a jamnut to hold the lock key flush to the face of the female member.

4. The device of claim 3 wherein the female member is a rod and the male member is a rod end terminal.

5. The device of claim 3 wherein the lock key has ears to support ends of a spring rotatably holding the dog screw.

6. The device of claim 3 wherein the lock key has a ledge to guide and support said dog screw.

7. The device of claim 3 wherein the lock key has bonded thereto a means to rotatably support and hold said dog screw.

8. The device of claim 3 wherein the lock key has a plate carried by a neck of the lock key that is adapted to receive a split washer holding the dog screw.

9. The device of claim 3 wherein the dog screw, lock key and jamnut are safety wired.

10. The device of claim 5 wherein the ears have facing shoulders to limit backward travel of the spring.

* * * * *